United States Patent
Corbisiero et al.

(10) Patent No.: US 6,421,173 B1
(45) Date of Patent: Jul. 16, 2002

(54) STEREOMICROSCOPE

(75) Inventors: Dennis Corbisiero, Rockaway, NY (US); Ohm Savanayana, Au (CH); Heinz Suhner; Ulrich Sander, both of Rebstein (CH)

(73) Assignee: Leica Microsystems AG, Heerbrugg (CH)

( * ) Notice: Subject to any disclaimer, the term of this patent is extended or adjusted under 35 U.S.C. 154(b) by 0 days.

(21) Appl. No.: 09/669,371

(22) Filed: Sep. 26, 2000

(30) Foreign Application Priority Data

Sep. 28, 1999 (CH) .............................................. 1789/99

(51) Int. Cl.⁷ .............................................. G02B 21/18
(52) U.S. Cl. ........................ 359/372; 359/376; 359/384
(58) Field of Search ................................ 359/368, 372, 359/373, 374, 375, 376, 377, 378, 381, 384

(56) References Cited

U.S. PATENT DOCUMENTS

| 4,486,078 A | * | 12/1984 | Hashimoto et al. | ......... 359/381 |
|---|---|---|---|---|
| 4,688,907 A | * | 8/1987 | Kleinberg | .................... 359/377 |
| 5,052,789 A | * | 10/1991 | Kleinberg | .................... 359/375 |
| 5,668,661 A | * | 9/1997 | Tomioka | ..................... 359/380 |
| 5,898,518 A | * | 4/1999 | Biber | ......................... 359/385 |

FOREIGN PATENT DOCUMENTS

| DE | 12 17 099 B | 5/1966 |
|---|---|---|
| DE | 195 41 420 A | 5/1996 |
| GB | 2 146 789 A | 4/1985 |

* cited by examiner

Primary Examiner—Mark A. Robinson
(74) Attorney, Agent, or Firm—Hodgson Russ LLP

(57) ABSTRACT

The invention relates to a stereomicroscope (1) with a main body (3) and wit an interface device (2) which is connected to the main body (3) and/or to an accessory (4), either permanently or in a manner that does not permit easy removal, and the interface device (2) permits the rotation of the accessory (4) relative to the main body (3) in the manner of a pivot bearing (5).

10 Claims, 4 Drawing Sheets

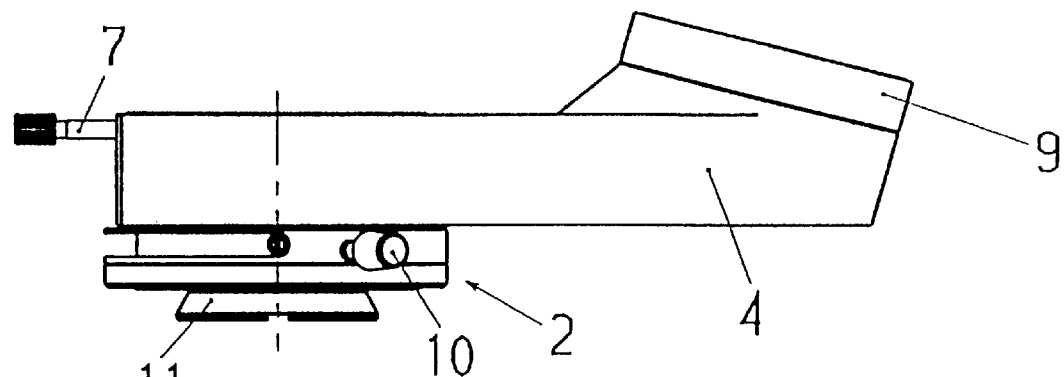
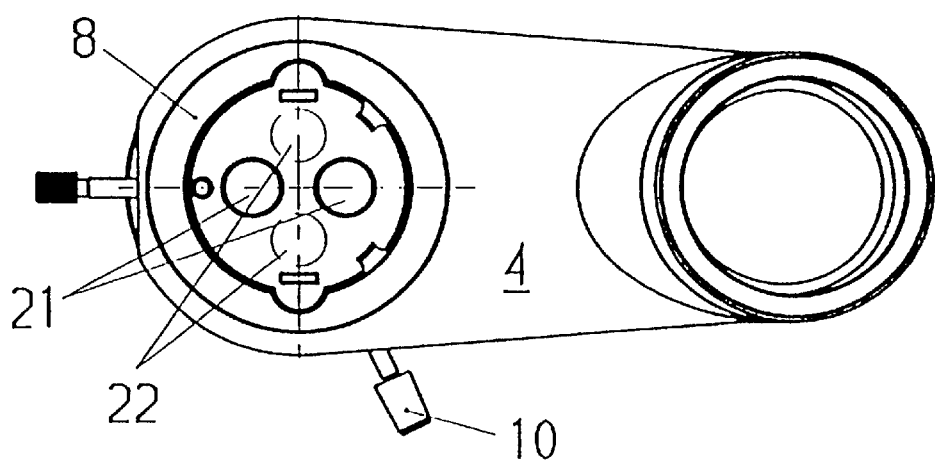
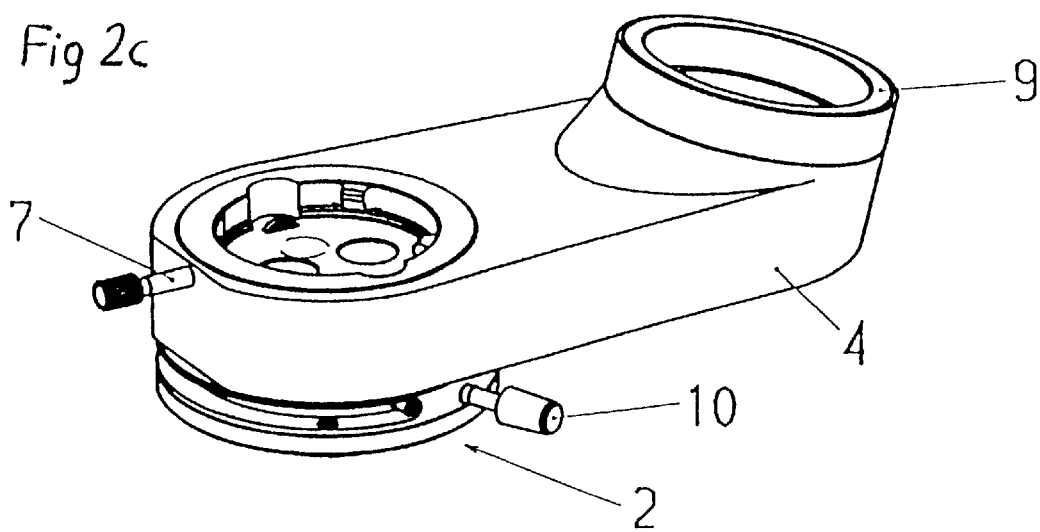

STEREOMICROSCOPE

CROSS-REFERENCE TO RELATED APPLICATIONS

The present application claims foreign priority under 35 U.S.C. § 119 of Swiss Application No. 1789/99 filed Sep. 28, 1999.

BACKGROUND OF THE INVENTION

1. Field of the Invention

The invention relates to generally to microscopes, and more particularly to a stereomicroscope with an interface or a connecting device to which accessories can be attached.

2. Description of the Related Art

An established microscope, the "M841," developed by Leica Microsystems AG of Heerbrugg, Switzerland, assignee of the present application, has two independent optical paths, each with its own zoom and with a shared main objective. The two optical paths are positioned at right angles, such that an assistant can directly watch a surgeon at work in the operating field. Given the independence of the two optical paths, there are no losses in light, so that both the surgeon and the assistant can view an optimally illuminated operating field. The M841 is frequently used in eye surgery. Here the assistant's tube is positioned to the side of the main microscope body, and thus to the side of the patient's head, on a bridge that projects outwards to a certain degree.

Depending on whether the right or the left eye is operated on, the assistant's tube is required on the left or right side of the patient's head, while the surgeon always sits in front of the patient's head and positions his or her surgeon's tube roughly in line with the head.

Reversing the position of the assistant's tube from right to left normally occurs in this manner:

a) removal of the surgeon's tube;
b) removal of the assistant's bridge;
c) remounting of the assistant's bridge, but swiveled 180° around the optical axis of the main objective; and
d) remounting of the surgeon's tube.

This change takes some time and requires skill. It is frequently the case, therefore, that technical assistants attempt to perform the change more simply and more quickly. They skip stage a) and attempt to remove the entire structure at once and perform the remounting according to steps b) and c). This "quick change" requires special skill and does not correspond to the procedure indicated by the manufacturer.

The literature, to be sure, discloses mechanisms that permit rotation of a tube device around an optical axis, but there it is performed for a different purpose and with different means. For example, German patent DE 3333471C2—like the prior and similar DE 1217099 B—describes a design permitting simultaneous observation for a first and second observer, in which two stereomicroscopes are so positioned one relative to the other that both observers view the same operating field. Here the two primary axes are positioned inside each other by means of a beam splitting mirror and are directed at the operating field. This design permits the two microscopes to be rotated around the optical axis, without the need for justification; i.e., the operator can select his own preferred angular tube position relative to the patient and the assistant's tube will follow it accordingly. Thus, positions on diametric sides of the patient can also be occupied.

The assembly there includes the surgeon's tube with the first microscope, including the assembly with the beam-splitter, and a second, associated microscope for the assistant. The assembly with the beam splitter can be rotated around the main axis of the first microscope.

Problems with respect to the speed of any desired change in position do not arise with this structure; nor are there any significant mounting requirements, since the "structure" (or "substructure") is basically secured in undetachable form to the first microscope and hangs below the microscope. On the other hand, this known assembly cannot be universally employed, since the two microscopes are permanently secured to each other.

Apart from the above, this known solution has a serious disadvantage: because there are two microscopes, the assembly is large and heavy. The design of the splitting mirror leads to a reduction in brightness, both for the surgeon and for the assistant, and this is a disadvantage. The heavy weight has a particularly negative effect if the microscope is mounted on a stand, as is usually the case in the operating room. Heavy weights result in heavy counterbalancing weights and in a high center of gravity for the microscope stand. A high center of gravity has a negative effect on the tipping behavior of the assembly and should be avoided whenever possible.

SUMMARY OF THE INVENTION

The invention is based on the task of solving the problem of repositioning and allowing the bridge and the assistant's tube to be converted in a simpler and faster manner. The present invention solves this problem for the first time in a satisfactory way.

In a special embodiment of the invention, the disadvantages of using two microscopes, one for the surgeon and one for the assistant, are avoided due to two independent optical paths provided in one microscope.

In accordance with the present invention, an interface device is provided for connecting an accessory part, such as a bridge for linking an assistant's viewing, to a main body of a microscope. The interface device is characterized by the fact that it is connected to the main body of the microscope and/or to the accessory part, by a locking screw that is by design difficult to remove. For example, the screw head can have a a special design, such that its manipulation requires a special tool, or a cover can be provided for the screw, or the screw can be made unusable, so that the interface device is lastingly secured to the main body of the microscope. Locking screws as understood in the invention are all structural elements which make possible the locking of two structural elements. Included among these, therefore, are elbow lever clamps and the like.

The interface device generally comprises upper and lower circular parts that can rotate relative to each other and that are attached to each other to form a pivot bearing. In its lower region, the lower part is designed as a mounting cone. The upper part is designed as a connection device for receiving a mounting cone and consequently includes locking projections and a locking screw which will preferably be hard to manipulate, or will have a cover, or will otherwise be difficult to access and operate.

Naturally the bridge, which is designed to receive the assistant's tube, is equipped with a connection for the operator's tube; here, as is known, it is possible to attach any desired modules to the connections on the bridge.

Screws as understood in the invention are all structural elements which make possible the locking of two structural elements. Included among these, therefore, are elbow lever clamps and the like.

BRIEF DESCRIPTION OF THE DRAWING FIGURES

The figures will be described in overlapping and interrelated fashion. They do not restrict the invention, but serve merely as examples for assemblies protected by the claims. The list of reference numerals, together with the disclosure contents of the patent claims, is to be understood as an integral part of the descriptive introduction. The nature and mode of operation of the present invention will now be more fully described in the following detailed description of the preferred embodiment taken with the accompanying drawing figures, in which:

FIG. 2a is a side elevational view showing the bridge with a securely attached interface device according to an embodiment of the present invention;

FIG. 2b is a top plan view of the embodiment shown in FIG. 2a;

FIG. 2c is a perspective view of the embodiment shown in FIGS. 2a and 2b;

FIG. 3b is a top plan view of the interface device shown in FIG. 3a;

DETAILED DESCRIPTION OF THE PREFERRED EMBODIMENTS

Two exemplary embodiments are described in greater detail on the basis of the drawings.

Figure 1:
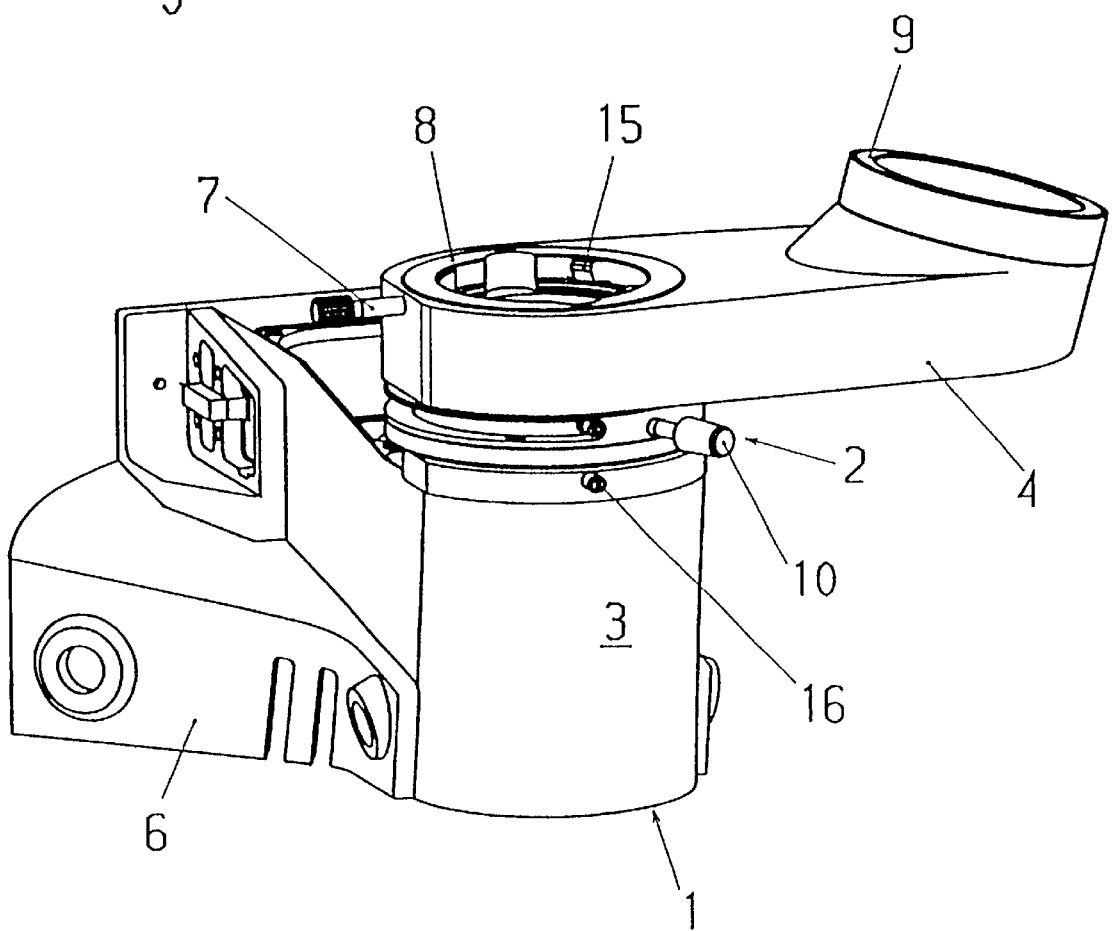
FIG. 1 is a perspective view showing a microscope with an attached bridge and an interface device according to an embodiment of the present invention.
Figure 3A:
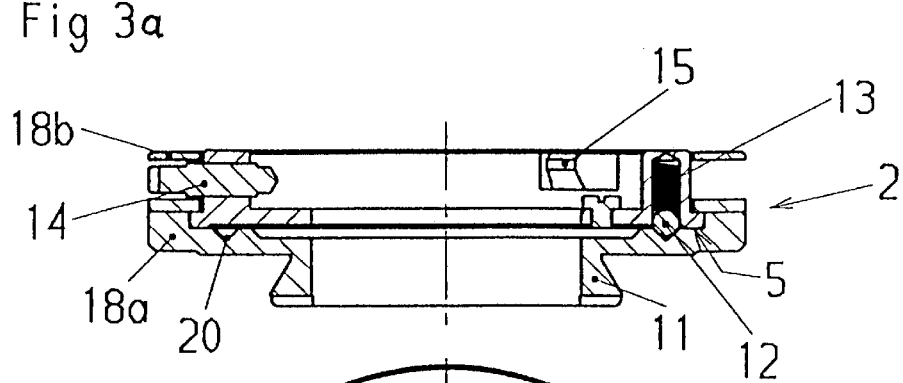
FIG. 3a is a cross-sectional view of an interface device according to the present invention.
Figure 3B:
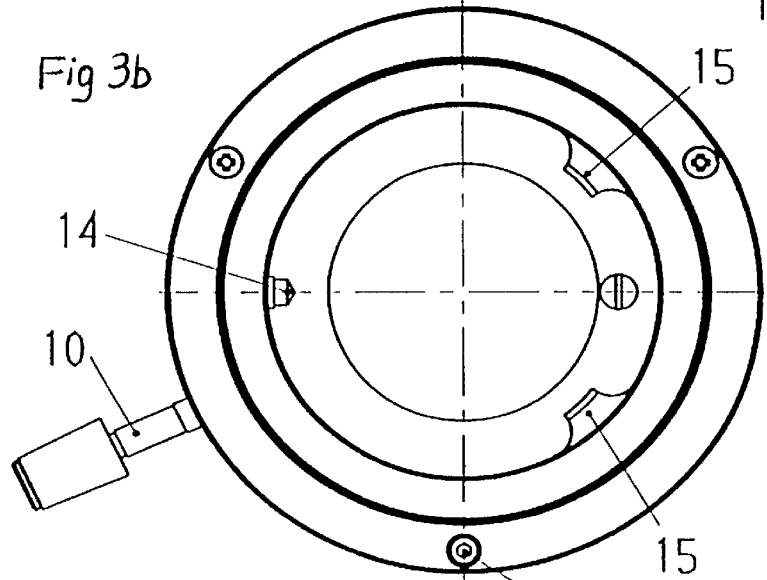
Figure 3C:
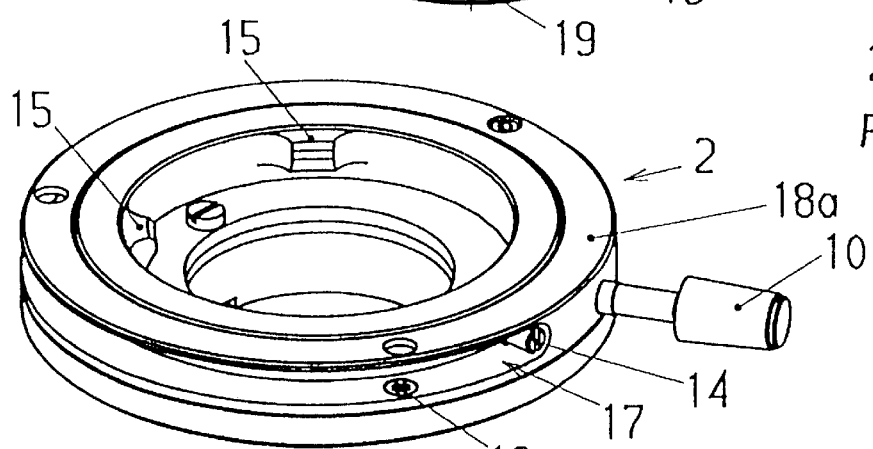
FIG. 3c is a perspective view of the interface device shown in FIGS. 3a and 3b.
Figure 3D:
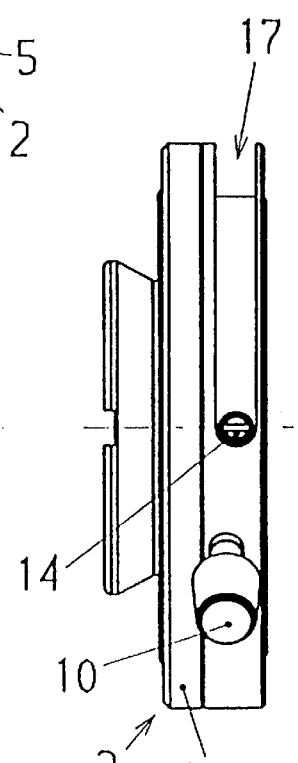
FIG. 3d is a side elevational view of the interface device shown in FIGS. 3a–3c.

Referring initially to FIG. 1., a conventional microscope, e.g., a surgical microscope 1, comprises a main body 3 and a housing 6, that in FIG. 1 bulges out on one side and contains, for example, lighting unit. At its upper end the main body 3 has a connection for an interface device 2 according to the invention. The connection corresponds to a conventional mounting cone. The new feature of this connection, however, rests in the fact that it is connected to the interface device 2 by means of a locking screw 16 that is hard to remove. This difficulty of removal can be achieved giving the screw head a special design, such that its manipulation requires a special tool; or by providing a cover for the screw, or simply by making the screw unusable, so that the interface device 2 is lastingly secured to the main body 3.

Referring also now to FIGS. 2a–2c and 3a–3d, the interface device 2 generally comprises two circular parts 18a and 18b that can rotate relative to each other and that are attached to each other in the manner of a pivot bearing 5. In its lower region, the lower part 18a is designed as a mounting cone 11. The inner part 18b, for its part, is designed as a connection device for a mounting cone and consequently includes locking projections 15 and a locking screw 14, which, like the screw 16, will preferably be hard to manipulate, or will have a cover, or will otherwise be difficult to access and operate.

In actual practice, the outer part 18a and the inner ring 18b could have reversed positions, such that the outer ring 18a is connected to an accessory above, while the inner ring is below.

The outer part 18a exhibits a release area 17, in which the locking screw 14 is provided with play in the rotating direction of the two parts 18a and 18b. The degree of play is precisely such as to permit rotation by the accessory part. In the depicted case, the degree of play is about 180°.

For reasons of mounting, the outer part 18a has two parts. The two parts are connected with screws 19, but could also be riveted together or glued, or they could have a single-piece design. The turning motion between the outer parts 18a and 18b can be braked or stopped by a locking screw 10. In the present embodiment, a snap mechanism is provided as the preferred form of locking. A locking ball 12, which is powered by a catch spring 13, locks with diametrically opposite snap-in holes 20 in the positions, or rotational positions, preferred for the two parts 18a and 18b. As in the initially described case involving a surgical microscope for ophthalmology, these positions face each other over a 180° rotational angle. As seen in FIG. 2b, stereo light paths 21 of a first stereo optical path for surgeon viewing pass upward through the bridge without hindrance. Meanwhile, stereo light paths 22 of a second stereo optical path for assistant viewing are angularly displaced by 90° relative to stereo light paths 21 of the first stereo optical path, and correspond in location to deflection mirrors for reflection of light into the assistant's tube through bridge 4.

FIGS. 2a–2c depict a preferred embodiment of the invention, in which the interface device 2 is connected in fixed fashion to a bridge 4 serving as accessory, from which it can be disconnected only with difficulty.

The bridge 4 itself is known to the prior art and exhibits a locking screw 7 and a connection 8 for mounting an eyepiece tube, or the like. It also has a connection 9 for an assistant's tube, which is depicted in only schematic fashion and can also exhibit a mounting-cone device.

An important component of the invention, therefore, is the two-part interface device 2, which permits rotation of the two parts, one relative to the other. In their mounted state, the two parts are inseparably connected in the manner of a pivot bearing; one part can be connected to the main body of the microscope 3, and the other part can be connected to an accessory, e.g., an eyepiece tube.

Variations of the invention can be such that the entire interface device 2 is inseparably connected to the main body 3; or, as an alternative, the entire interface device 2 can be connected in non-detachable form to the accessory 4. In the later two variations, the free and unattached connection area of the interface device 2 will exhibit a conventional connection, e.g., a mounting-cone, as well as a locking screw.

Figure 4:
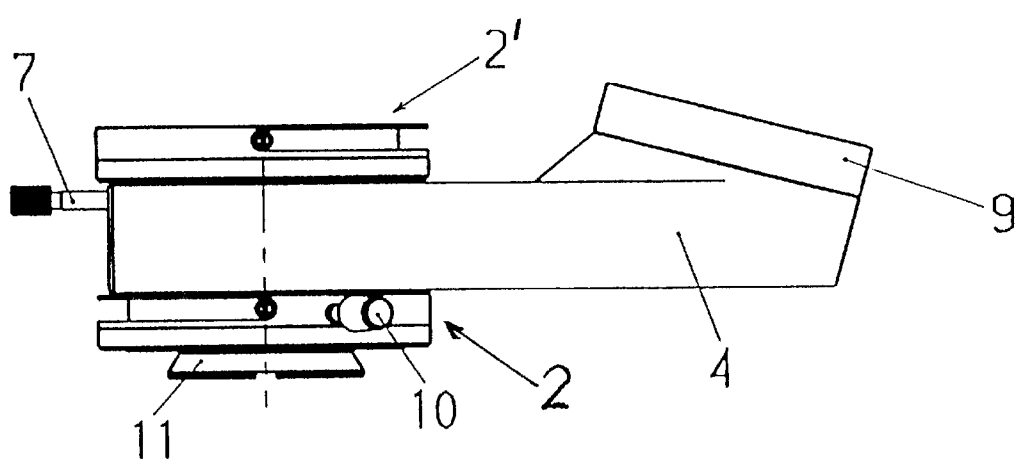
FIG. 4 is a side elevational view showing a bridge with a securely attached two-part hinge-like interface device according to another embodiment of the present invention.

In the special assembly according to FIG. 4, interface devices 2, 2' are provided on the upper and lower sides of the bridge, such that when the bridge 4 is rotated the original position of the microscope 3 and any tubes or the like mounted on the interface 2' retain their relative position, without any parts having to be separable or removable in design.

According to another embodiment variant, parts 2 and 2' can be rigidly connected, so that they form a kind of pivot, as in a hinge. The parts 2 and 2' can be installed to enclose bridge 4 like a clamp.

The combination of the depicted features among themselves is also included within the scope of the invention, as are combinations of the indicated interfaces with any known microscope parts or accessory parts which heretofore were attached to comparable interfaces when the need arose.

List of Reference Numerals 1 stereomicroscope
2 interface device

2' second interface device, when necessary attached along with the first interface device to a hinge-like component, on which the bridge 4 is mounted and locked in swivel fashion
3 main body
4 bridge, accessory part
5 pivot bearing
6 housing
7 locking screw for eyepiece tube
8 connection for eyepiece tube
9 connection for assistant's tube; in principle, it may be designed like connection 8
10 locking screw for rotation around the main objective axis
11 mounting cone
12 locking ball
13 catch spring
14 locking screw for attachment to accessory (4), also operates as a stop pin for rotating motion
15 locking projection
16 locking screw for attachment to main body (3)
17 release area
18a,b parts that can rotate in relation to each other
19 screw
20 snap-in holes
21 stereo light paths
22 stereo light path displaced 90°; located at this point, in undisplaced condition, are the deflection mirrors for reflection into the assistant's tube through bridge 4

What is claimed is:

1. A stereomicroscope comprising:
   a main body for supporting an objective lens having a main optical axis;
   at least one stereo optical path passing through said main body; and
   an interface device for securely connecting an accessory part to said main body to inhibit removal of said accessory part from said stereomicroscope, wherein said interface device includes a pivot bearing by which said accessory part can be rotated at least 90° about said main optical axis and means for locking the rotational position of said accessory part in place, and said interface device is a removable module that is secured to said main body by at least one first screw and is secured to said accessory part by at least one second screw, wherein operation of said at least one first screw and said at least one second screw requires a specialized tool, and said means for locking includes a third screw that is easily accessible for stopping rotational movement of said accessory part about said main optical axis.

2. The stereomicroscope according to claim 1, wherein said interface device is securely connected to said main body to inhibit removal of said interface device from said main body.

3. The stereomicroscope according to claim 1, wherein said means for locking further functions to guide said accessory part into one of a plurality of selectable rotational positions.

4. The stereomicroscope according to claim 3, wherein said plurality of selectable rotational positions comprises a pair of diametrically opposite rotational positions.

5. The stereomicroscope according to claim 4, wherein said means for locking includes a spring-biased locking ball that operably engages with diametrically opposite snapin-holes.

6. A stereomicroscope comprising:
   a main body for supporting an objective lens having a main optical axis;
   at least one stereo optical path passing through said main body; and an interface device for securely connecting an accessory part to said main body to inhibit removal of said accessory part from said stereomicroscope, wherein said interface device includes a pivot bearing by which said accessory part can be rotated at least 90° about said main optical axis and means for locking the rotational position of said accessory part in place, and said interface device is a removable module that is secured to said main body by at least one first screw and is secured to said accessory part by at least one second screw, wherein said at least one first screw and said at least one second screw are each outfitted with a cover to restrict access thereto, and said means for locking includes a third screw that is easily accessible for stopping rotational movement of said accessory part about said main optical axis.

7. The stereomicroscope according to claim 6, wherein said interface device is securely connected to said main body to inhibit removal of said interface device from said main body.

8. The stereomicroscope according to claim 6, wherein said means for locking further functions to guide said accessory part into one of a plurality of selectable rotational positions.

9. The stereomicroscope according to claim 8, wherein said plurality of selectable rotational positions comprises a pair of diametrically opposite rotational positions.

10. The stereomicroscope according to claim 9, wherein said means for locking includes a spring-biased locking ball that operably engages with diametrically opposite snap-in holes.

* * * * *